United States Patent
Bayer

(10) Patent No.: US 7,150,467 B2
(45) Date of Patent: Dec. 19, 2006

(54) HOUSING FOR AIRBAG MODULE

(75) Inventor: Dean M. Bayer, Anderson, IN (US)

(73) Assignee: Delphi Technologies, Inc., Troy, MI (US)

( * ) Notice: Subject to any disclaimer, the term of this patent is extended or adjusted under 35 U.S.C. 154(b) by 275 days.

(21) Appl. No.: 10/174,081

(22) Filed: Jun. 18, 2002

(65) Prior Publication Data

US 2003/0230873 A1 Dec. 18, 2003

(51) Int. Cl.
B60R 21/20 (2006.01)

(52) U.S. Cl. .................. 280/728.2; 280/728.3

(58) Field of Classification Search ............ 280/728.2
See application file for complete search history.

(56) References Cited

U.S. PATENT DOCUMENTS

| | | | | |
|---|---|---|---|---|
| 4,153,273 A | * | 5/1979 | Risko | 280/740 |
| 5,087,067 A | * | 2/1992 | Seki et al. | 280/732 |
| 5,209,519 A | * | 5/1993 | Shiga et al. | 280/728.2 |
| 5,342,083 A | * | 8/1994 | Gentile et al. | 280/728.2 |
| 5,360,231 A | * | 11/1994 | Adams | 280/728.2 |
| 5,366,240 A | * | 11/1994 | Hanabusa et al. | 280/728.2 |
| 5,403,033 A | * | 4/1995 | Koma | 280/728.2 |
| 5,482,313 A | * | 1/1996 | Ikeya et al. | 280/728.2 |
| 5,762,363 A | * | 6/1998 | Brown et al. | 280/730.2 |
| 5,788,267 A | * | 8/1998 | Lotspih et al. | 280/728.2 |
| 5,851,023 A | * | 12/1998 | Nagata et al. | 280/728.3 |
| 5,863,063 A | * | 1/1999 | Harrell | 280/730.2 |
| 5,873,598 A | | 2/1999 | Yoshioka et al. | |
| 6,024,377 A | * | 2/2000 | Lane, Jr. | 280/728.3 |
| 6,045,151 A | * | 4/2000 | Wu | 280/728.3 |
| 6,161,866 A | | 12/2000 | Ryan et al. | |
| 6,168,186 B1 | | 1/2001 | Welch et al. | |
| 6,173,988 B1 | * | 1/2001 | Igawa | 280/728.2 |
| 6,196,582 B1 | | 3/2001 | Sparkman et al. | |
| 6,203,061 B1 | | 3/2001 | Niederman et al. | |
| 6,213,502 B1 | | 4/2001 | Ryan et al. | |
| 6,247,726 B1 | | 6/2001 | Ryan | |
| 6,260,330 B1 | | 7/2001 | Borowski et al. | |
| 6,283,498 B1 | * | 9/2001 | Breitweg | 280/728.3 |
| 6,286,858 B1 | | 9/2001 | Shepherd et al. | |
| 6,331,015 B1 | | 12/2001 | Doxey et al. | |
| 6,361,064 B1 | | 3/2002 | Hopf et al. | |
| 6,390,501 B1 | | 5/2002 | Greib et al. | |
| 6,409,213 B1 | | 6/2002 | Webber et al. | |
| 6,422,589 B1 | | 7/2002 | Ostermann et al. | |
| 6,422,597 B1 | | 7/2002 | Pinsenschaum et al. | |
| 6,431,596 B1 | | 8/2002 | Ryan et al. | |
| 6,435,541 B1 | | 8/2002 | Thomas et al. | |

(Continued)

FOREIGN PATENT DOCUMENTS

| | | |
|---|---|---|
| DE | 19912178 A1 | 9/2000 |
| DE | 20106598 U1 | 8/2001 |
| DE | 20106 599 U1 | 8/2001 |
| EP | 1088711 A2 | 4/2001 |

OTHER PUBLICATIONS

European Search Report dated Jul. 4, 2005.
International Publication Number WO02/098712 A1 dated Dec. 12, 2002.

*Primary Examiner*—Teri Pham Luu
*Assistant Examiner*—Bret C. Hayes
(74) *Attorney, Agent, or Firm*—Jimmy L. Funke

(57) ABSTRACT

An elongated housing for use with an airbag module is provided. The housing comprises a first wall, a second wall, a bottom wall joining the first and second walls such that a first width is defined by the housing, and a cushion deployment opening opposite the bottom wall. The cushion deployment opening is between a first edge of the first wall and a second edge of the second wall. The cushion deployment opening has a second width that is between about 90 percent of the first width and about 30 percent of the first width.

35 Claims, 4 Drawing Sheets

U.S. PATENT DOCUMENTS

| | | |
|---|---|---|
| 6,439,603 B1 | 8/2002 | Damman et al. |
| 6,454,300 B1 | 9/2002 | Dunkle et al. |
| 6,499,765 B1 | 12/2002 | Hawthorn et al. |
| 6,554,318 B1 | 4/2003 | Kohut et al. |
| 6,561,545 B1 | 5/2003 | Greib et al. |
| 6,592,146 B1 | 7/2003 | Pinsenschaum et al. |
| 6,626,455 B1 * | 9/2003 | Webber et al. ............ 280/728.2 |
| 2002/0024198 A1 * | 2/2002 | Umezawa et al. ........ 280/728.2 |
| 2002/0050701 A1 * | 5/2002 | Amamori ................. 280/728.2 |
| 2002/0063415 A1 * | 5/2002 | Uchiyama et al. ........ 280/728.2 |
| 2002/0063416 A1 * | 5/2002 | Kamaiji et al. ........... 280/728.2 |

\* cited by examiner

HOUSING FOR AIRBAG MODULE

TECHNICAL FIELD

This disclosure relates generally to inflatable restraint systems or airbags for vehicles. Specifically, this disclosure relates to a housing for an airbag module.

BACKGROUND

Airbag modules have become common in modern automobiles. An airbag module typically comprises an inflatable cushion and an inflator within a housing. The module is installed in a desired position within the vehicle, such as the steering wheel, the dashboard, the seat, the A-pillar, and other locations within the vehicle. The module is covered with a frangible door to protect and/or conceal the airbag. The inflatable cushion is stored in a folded position within the housing in fluid communication with the inflator.

In response to an activation event or occurrence, a sensor provides a signal for activating the inflator. The inflator provides a supply of inflating gas to the cushion to inflate the cushion. The inflation gas causes the cushion to open the door and to deploy from the housing into the vehicle.

Various profiles, cross-sections, locations, deployment door concepts, and mounting schemes are used to design airbag modules and the associated instrument panel. For example, airbag modules are often mounted in the instrument panel or dashboard of a vehicle proximate to the windshield of the vehicle (e.g., top mounted). These top mounted modules are exposed to demanding environmental conditions and demanding design constraints. In order to meet these conditions and constraints, prior airbag modules have been mounted aft of (e.g., further from) the windshield.

There is a continuing desire for airbag modules that are mountable closer to the windshield to improve the performance of the airbag module and to increase the relative freedom of location, size, and styling of the instrument panel and/or deployment door.

SUMMARY

An elongated housing for use with an airbag module is provided. The housing comprises a first wall, a second wall, a bottom wall joining the first and second walls such that a first width is defined by the housing, and a cushion deployment opening opposite the bottom wall. The cushion deployment opening is between a first edge of the first wall and a second edge of the second wall. The cushion deployment opening has a second width that is between about 90 percent of the first width and about 30 percent of the first width.

An airbag module, comprising a housing, an inflator, and an inflatable cushion is also provided. The housing has a first chamber, a second chamber, a deployment opening at one end of the housing, and an inflation gas opening at one end of the first chamber. The deployment opening has a first width and the housing has a second width. The first width is between about 90 percent of the second width and about 30 percent of the second width. The inflator provides a quantity of inflation gas to the first chamber. The inflatable cushion is stored in a folded condition in the second chamber. The inflatable cushion has an inflation opening secured across the inflation gas opening such that the quantity of inflation gas causes the inflatable cushion to deploy from the housing through the deployment opening.

The above-described and other features are appreciated and understood by those skilled in the art from the following detailed description, drawings, and appended claims.

DESCRIPTION OF THE PREFERRED EMBODIMENT

An airbag module having a housing configured to minimize the cushion deployment opening of the housing with respect to the overall width of the housing is provided. The minimized cushion deployment allows the deployment door covering the module to also be minimized.

The smaller deployment opening and door increase the flexibility in designing the vehicle interior. The narrow deployment opening allows the module, and thus the deployment door, to be moved forward in the vehicle. By moving the module forward, the door does not impinge on the windshield or other areas within the vehicle when opening.

Thus, the housing of the present disclosure takes advantage of the reduced width of the cushion deployment opening and the effect it has on the size, location and styling of the deployment door as well as the operational performance of the module.

Figure 1:
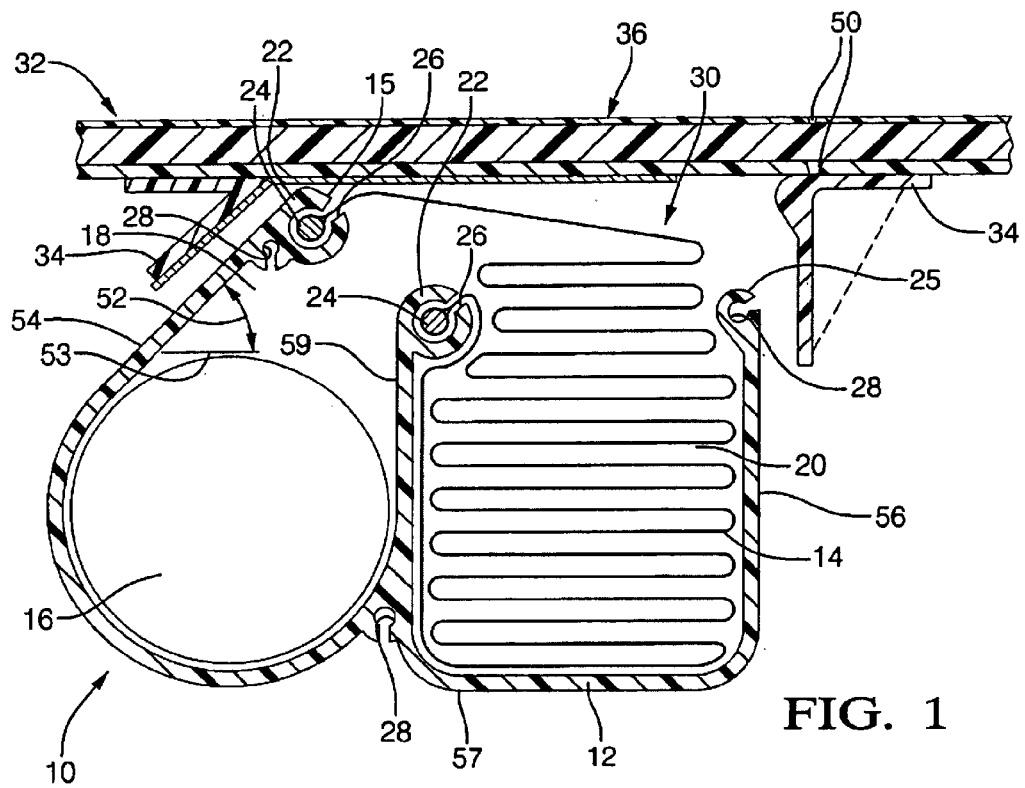
FIG. 1 is a first sectional view of a first exemplary embodiment of an airbag module.

Referring now to FIG. 1, a first exemplary embodiment of an airbag module 10 is illustrated. Module 10 comprises a housing 12, an inflatable cushion 14, and a gas generator or inflator 16. Housing 12 includes a first chamber 18 and a second chamber 20.

Inflatable cushion 14 is stored in a folded position in second chamber 20. Inflatable cushion 14 is sealed across the mouth or opening of first chamber 18 at connection points 22 such that the cushion is in fluid communication with the first chamber.

In the illustrated embodiment, the ends of the cushion 14 are each sewn around a retention rod 24. Alternately, retention rod 24 is slid through openings sewn into cushion 14. Housing 12 comprises a key way 26 disposed at connection points 22. Rods 24 are configured to mate with key ways 26 to secure cushion 14 to housing 12. Of course, it should be recognized that other methods of securing the cushion to the housing are contemplated.

The inflator is configured to generate a quantity of inflation gas sufficient to inflate cushion 14. Specifically, inflator 16 is positioned to exhaust the inflation gas into first chamber 18. Thus, the inflation gas generated by inflator 16 deploys the cushion from module 10.

Housing 12 is made of materials sufficient to contain the pressure of the inflation gas generated from inflator 16. For example, the housing can be made from extruded materials such as a metal or a composite material including plastic, plastic impregnated with reinforcing fibers, steel, aluminum, and alloys of any one of the foregoing. Alternately, the housing can be molded, cast, or pressed formed from sheet materials.

It is also contemplated for housing 12 to be formed by a pultrusion process. For example, the pultrusion process can be used for composite thermoset resins. Here, a fiber reinforcement is pulled through a resin impregnation area to coat the reinforcement with resin, through preform plates to begin to shape the fiber/resin bundle, and through a heated die to cure the resin. A cured part in the desired shape that requires no further processing exits from the die.

Regardless of the process or material used for housing 12, the contemplated use for the housing is to provide a length of stock material having the desired cross section. The housing of the desired length is then cut from this stock material. Thus, multiple housings having the same cross section and varying lengths can be cut from the same piece of stock material. The housing can be cut from the stock material as it passed from the extrusion/pultrusion machine. Alternately, the stock material can be provided in predetermined lengths, which are cut to size as needed.

The ends of housing 12 are closed by way of end caps (not shown) connected to the housing. For example, the end caps are secured to housing 12 by mechanical fasteners at mounting holes 28 disposed in the housing. The end caps can be configured to secure inflator 16 in housing 12, to secure rods 24 in key ways 26, as well as to help maintain the shape of the housing during deployment.

Inflatable cushion 14 is also made of materials sufficient to contain the pressure of the inflation gas generated from inflator 16. For example, cushion 14 can be made from materials such as coated or uncoated nylon and polyester.

Inflator 16 is a pyrotechnical inflator, a hybrid compressed gas inflator, a compressed gas inflator, a multiple stage inflator, and combinations thereof. The inflator is illustrated as a cylinder shaped inflator. Of course, it should be recognized that inflators having alternate shapes are contemplated.

A cushion deployment opening 30 is defined by housing 12. Specifically, the cushion deployment opening 30 is the opening between a front edge 15 of housing 12 and a rear edge 25 of the housing.

Module 10 is configured to be secured to an instrument panel 32 of a vehicle by way of one or more brackets 34 on the module or the instrument panel. Instrument panel 32 includes a deployment door 36 configured to conceal and protect cushion deployment opening 30. Deployment door 36 is a frangible section of instrument panel 32 that is configured to tear or open when the cushion is inflated by the inflator.

By way of example, prior airbag modules have a housing with a width (e.g., fore/aft dimension) of about 132 millimeters and a length (e.g., cross-car dimension) of about 258 millimeters. Since the cushion deployment opening is defined along an open side of the housing, the opening is about 132 millimeters wide and about 258 millimeters long. Thus, the ratio of the cushion deployment opening to the overall width of the housing is about 100 percent. Further, the deployment door is typically a minimum of about 10 millimeters wider and longer than the cushion deployment opening. Thus, prior airbag modules have a deployment door of with a width of about 148 millimeters and a length of about 266 millimeters.

In a first exemplary embodiment of module 10, the module has a cushion deployment opening 30 that is significantly narrower than the width of the housing. Thus, the module also enables the use of a deployment door 36 that is significantly narrower than prior doors.

By way of example, housing 12 of FIG. 1 also has an overall a width of about 132 millimeters and a length of about 258 millimeters. However, housing 12 defines a deployment opening 30 with a width of about 89 millimeters and a length of about 258 millimeters. Thus, housing 12 has a ratio of the cushion deployment opening 30 to the overall width of the housing of about 66 percent. The reduced width of opening 30 allows the use of a deployment door 36 having a width of about 100 millimeters and a length of about 266 millimeters.

Additionally, rear edge 25 of housing 12 can be positioned below instrument panel 32 by a specified distance. For example, the rear edge is preferable below the instrument panel 32 by about 20 millimeters.

Figure 2:
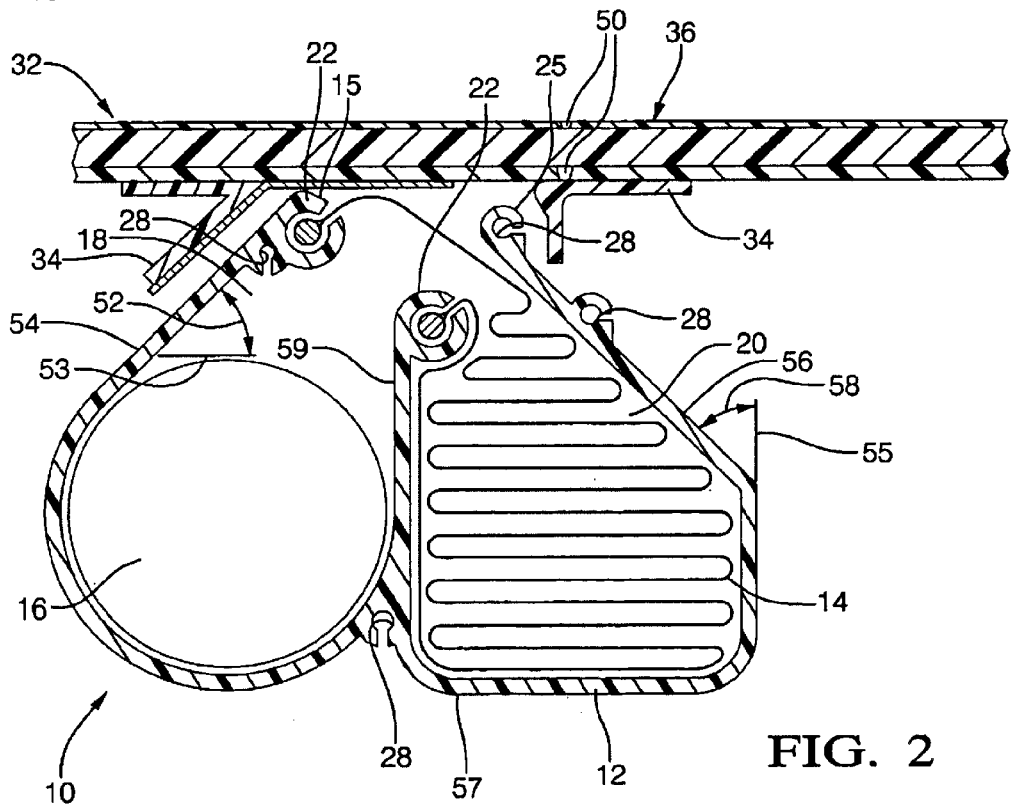
FIG. 2 is a first sectional view of a second exemplary embodiment of an airbag module.
Figure 4:
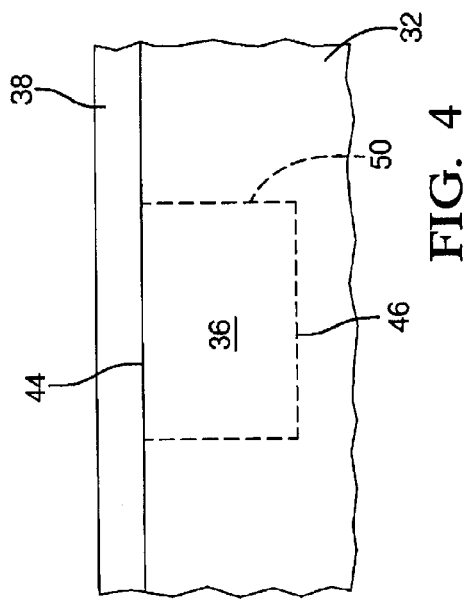
FIG. 4 is a top view of FIG. 2.
Figure 3:
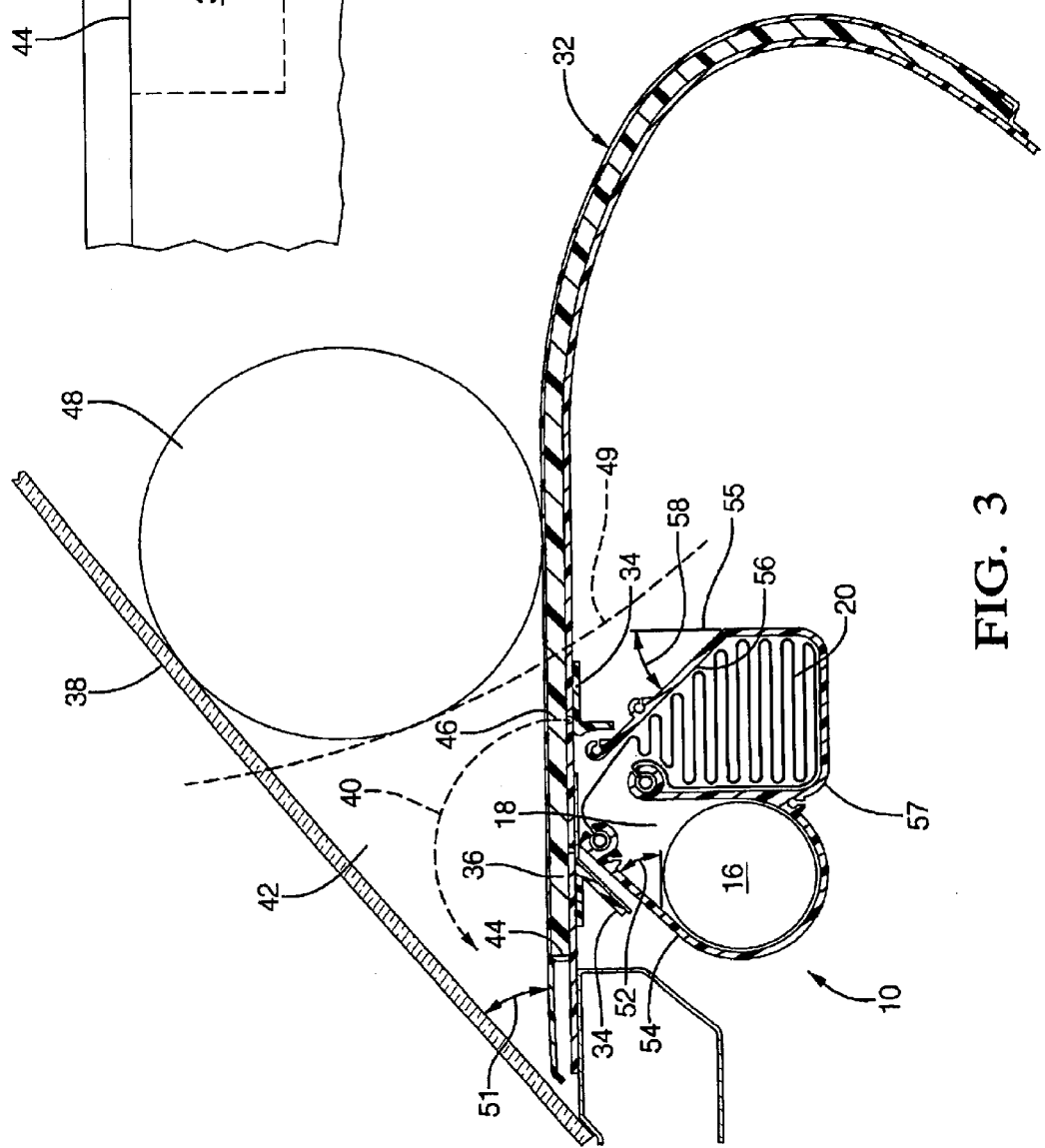
FIG. 3 is a second sectional view of the airbag module of FIG. 2.

Turning now to FIGS. 2–4, an alternate exemplary embodiment of airbag module 10 is illustrated.

Module 10 of FIG. 2 illustrates a ratio of cushion deployment opening 30 to the overall width of housing 12 of about 33 percent. In this alternate exemplary embodiment, the width of cushion deployment opening 30 is about 45 millimeters and the length is about 258 millimeters. Here, deployment door 36 has a width of about 55 millimeters and a length of about 266 millimeters.

Module 10 is illustrated in FIG. 3 with respect to instrument panel 32 and windshield 38 of the vehicle. For purposes of clarity, cushion 14 is not illustrated.

Upon deployment of cushion 14, door 36 is configured to open along a door-opening path 40 (illustrated in phantom). Path 40 is defined through a first area 42. First area 42 is bounded by windshield 38, instrument panel 32, and a second area 48. Second area 48 is defined as a substantially spherical area. In one embodiment, second area 48 has a radius of about 82 millimeters. Of course, it is contemplated for the second area to have a larger or a smaller radius.

The forward most location of second area 48 is the point of the second area that is tangent to line 49. This forward most point is also defined by area 48 making contact with windshield 38 and instrument panel 32. Of course, the forward most location of second area 48 is dependent upon, for example, the rake and curvature of the windshield and the instrument panel. This results in an angle 51 being defined between the windshield and the instrument panel.

In the illustrated example, windshield 38 is substantially linear and has a rake of about 49 degrees from the vertical. Instrument panel 32 has a rake that is about zero degrees from horizontal (e.g., approximately horizontal) and is substantially linear in the region of the second area. Thus, angle 51 is about 41 degrees.

The door 36 has a forward edge 44 proximate the windshield 38 and a rearward edge 46 remote from the windshield. A tear seam 50 (FIG. 4) in the instrument panel 32 defines the door 36. Upon deployment of the cushion 14, the cushion ruptures or tears along the tear seam 50 such that the door 36 opens. As the door 36 opens, it pivots about the forward edge 44 such that the rearward edge 46 travels along the path 40.

The performance of the module 10 is enhanced by the small width of the door 36 and by moving the module forward towards the windshield 38. For example, the small width of the door 36 ensures that the path 40 is also minimized. Thus, the path 40 of the door 36 does not impinge on either the windshield 38 or the second area 48. Further, the forward mounting of the module 10 also allows the brackets 34 and/or the rear edge 25 to be forward of the second area 48. In this embodiment, the rear edge 25 can substantially even with the instrument panel 32 since the rear edge is forward of the second area 48. For example, the rear edge 25 is preferable below the instrument panel 32 by about 8 millimeters.

Accordingly, in the illustrated example, module 10 with a ratio of the cushion deployment opening 30 to the overall width of the housing 12 of about 33 percent can be moved such that forward edge 44 of door 36 is about 65 millimeters closer to windshield 38 than the prior apparatus (e.g., where the ratio is about 100 percent). Additionally, the rearward edge 46 of the door 36 can be moved forward about 107 millimeters as compared to the prior apparatus.

The small width of the door 36 also simplifies the support structure (e.g., brackets 34) necessary to support the module 10, the door 36, and the instrument panel 32. For example, the small width of the door 36 allows the tear seam 50 to be generally U-shaped (FIG. 4) and to pivot towards the windshield 38.

The module 10 is also configured to direct the inflation gas from the module in a desired direction. For example in the illustrated embodiment, the housing 12 is configured to direct the inflation gas at an acute angle with respect to the cushion deployment opening 30. Specifically, the inflation gas is directed by the module 10 along a first angle 52.

The first angle 52 is defined as the angle of the front wall 54 of the housing 12 with respect to a first plane 53. In the exemplary embodiment illustrated in FIGS. 2–5, the first angle 52 is about 45 degrees. Namely, the first angle 52 is slightly less than parallel to the rake of the windshield 38. Thus, the first angle 52 ensures that the inflation gas is directed between the windshield 38 and the instrument panel 32. Specifically, first angle 52 ensures that the inflation gas is directed towards second area 48.

At least a portion of the rear wall 56 of the housing 12 is disposed along a second angle 58, best seen in FIGS. 2–3. Second angle 58 is defined as the angle of rear wall 56 with respect to a second plane 55. Rear wall 56 is illustrated, by way of example only, as having a second angle 58 of about 45 degrees.

Figure 5:
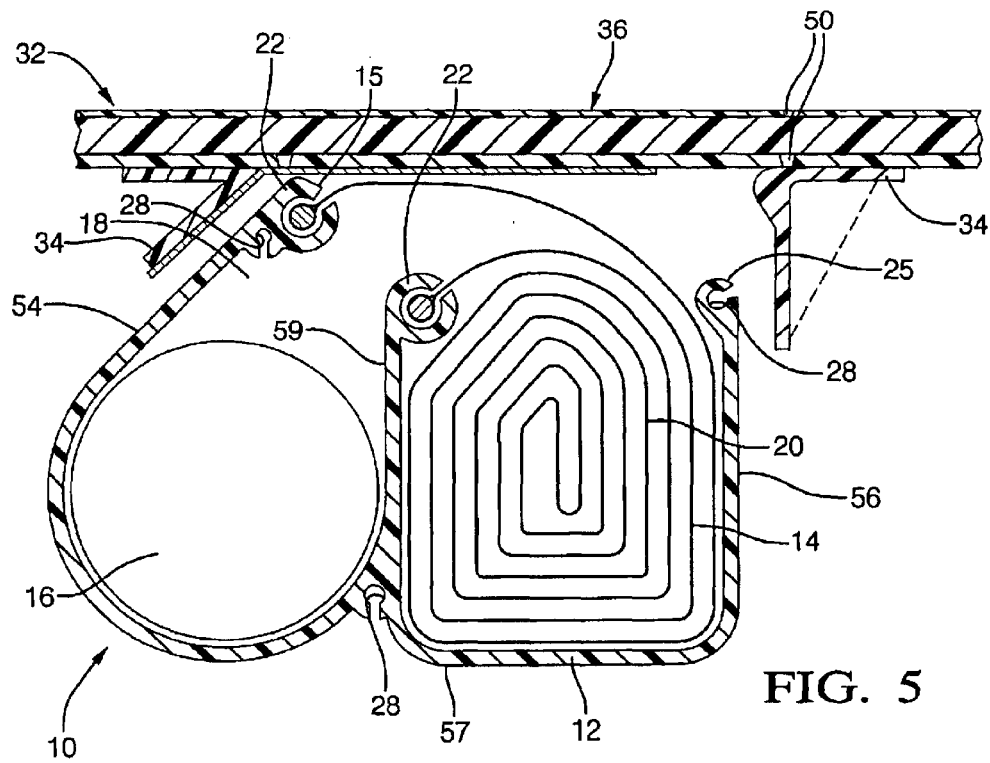
FIGS. 5–7 are first sectional views of various alternate exemplary embodiments of the airbag module of FIG. 1.
Figure 6:
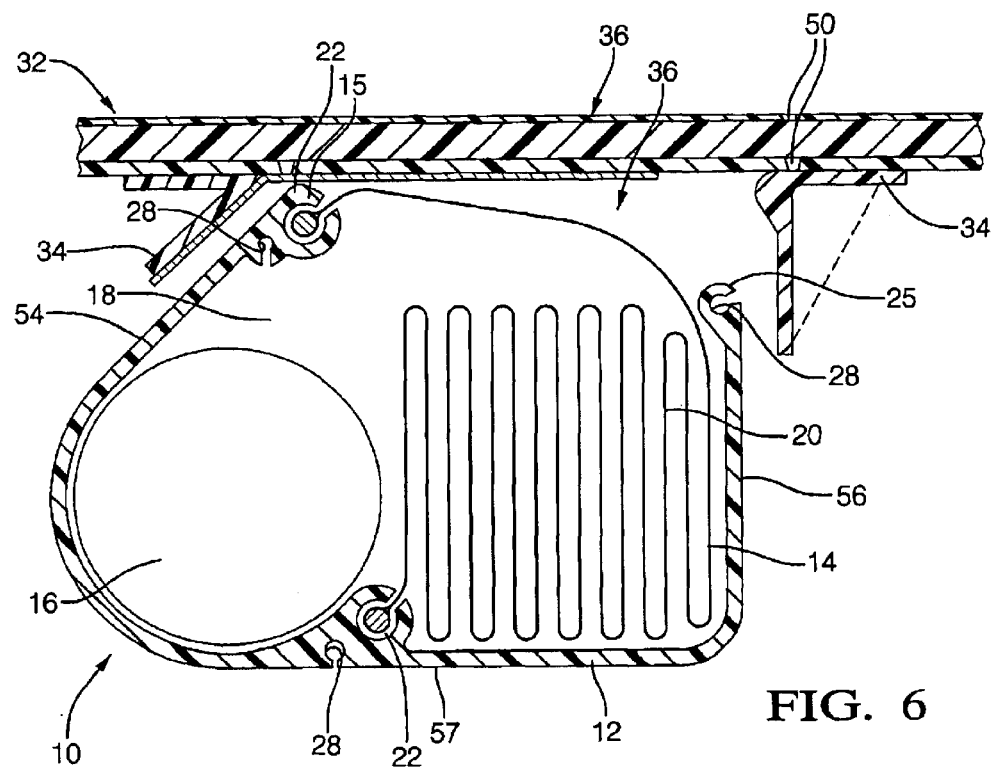

Of course, it should be recognized that other angles for the first and second angles are contemplated by the present disclosure. For example, first angle 52 can be more than or equal to about 10 degrees. Alternately, first angle 52 can be less than or equal to about 80 degrees. Second angle 58 can be at least about zero degrees. Alternately, second angle 58 can be less than or equal to about 60 degrees. FIGS. 1 and 5–6 illustrate second angle 58 of about zero degrees.

Thus, the first and second angles can be modified to tune the performance of the module to a particular vehicle. For example, the size of the cushion deployment opening is dependant upon the relationship between the first and second angles. Namely, opening 30 is dependent upon the degree with which rear wall 56 is angled forward towards front wall 54, and the degree with which the front wall is angled rearward towards the rear wall. Further, the direction of the inflation gas is dependent upon the degree with which front wall 54 is angled rearward.

The direction of the inflation gas also allows cushion 14 to be deployed under pressure. Specifically, inflator 16 exhausts the inflation gas into cushion 14 as it is deployed though cushion opening 30. Thus as cushion 14 is deployed, the portion of the cushion that has been deployed through opening 30 is pressurized, whereas the portion of the cushion that has not been deployed through the opening is not pressurized. This deployment of cushion 14 under pressure improves the performance of module 10. For example, this deployment of cushion 14 under pressure allows the cushion to achieve its desired shape while following the contour of instrument panel 32.

The deployment of the cushion under pressure also desensitizes inflatable cushion 14 to the particular fold geometry of the cushion. Thus, cushion 14 can be folded in any manner. For example, cushion 14 can have a horizontal fan fold geometry (FIGS. 1 and 2), a roll fold geometry (FIG. 5), or a vertical fold geometry (FIG. 6).

It should be recognized that the various embodiments of module 10 illustrated in FIGS. 1–5 and 7 show housing 12 having separate inflation and cushion chambers (18 and 20). Here, housing 12 includes a bottom wall 57 and a central wall 59. The bottom wall connects front wall 54 to rear wall 56. The central wall 59 separates chambers 18 and 20.

Of course, module 10 can have a combined inflation and cushion chamber. For example, an alternate exemplary embodiment of module 10 having combined or non-separated inflation and cushion chambers (18 and 20) is illustrated in FIG. 6. Here, housing 12 includes only a bottom wall 57 connecting front wall 54 to rear wall 56.

Figure 7:
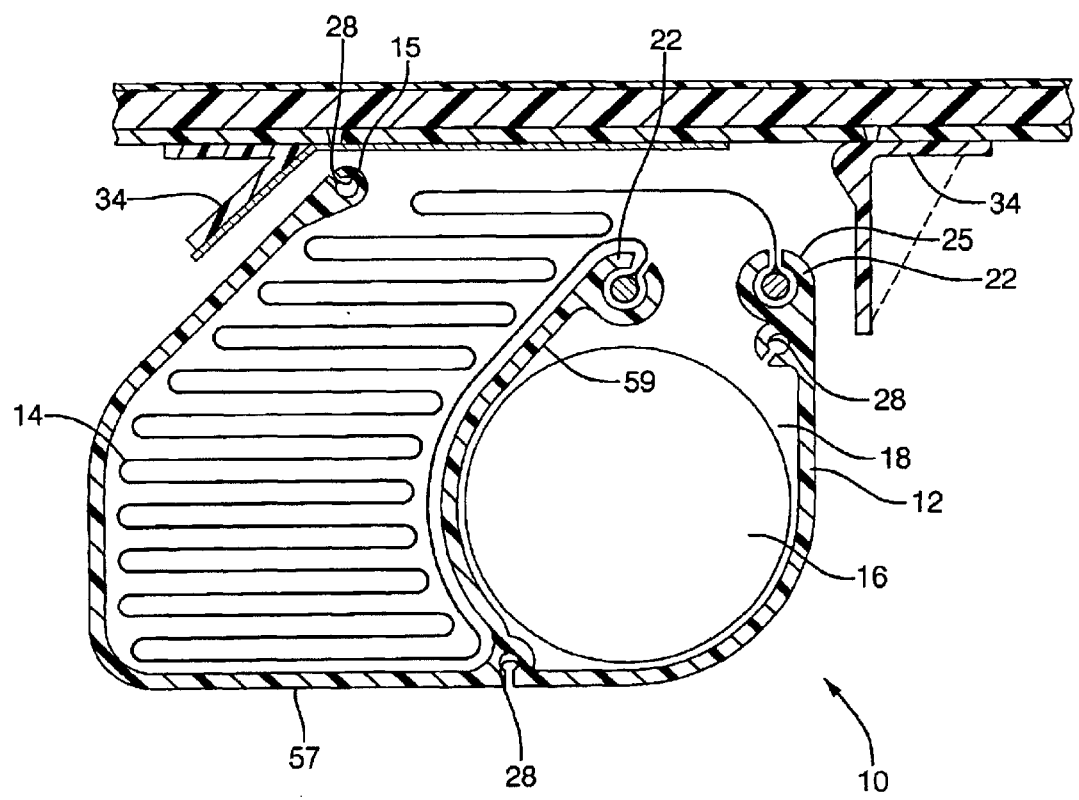

It should also be recognized that the various embodiments of module 10 illustrated in FIGS. 1–6 show housing 12 having inflator 16 on the front side (e.g., in car position) of the module by way of example only. Specifically, FIGS. 1–6 illustrate the cushion chamber 20 aft of the inflator chamber 18. Of course, it is contemplated for inflator chamber 18 to be aft of cushion chamber 20. An exemplary embodiment of inflator chamber 18 being aft of cushion chamber 20 is illustrated in FIG. 7. Thus, module 10 allows flexibility with respect to the positioning of chambers 18 and 20 with respect to one another to provide even greater design freedom to locate module in instrument panel 32.

Further, it should be recognized that module 10 is described above by way of example only as having a ratio of cushion deployment opening 30 to the overall width of housing 12 of about 33 percent and about 66 percent. Of course, other ratios are contemplated. For example, it is contemplated that the ratio of the cushion deployment opening to the width of the housing to be more than or equal to about 30 percent. It is also contemplated that the ratio of the cushion deployment opening to the width of the housing to be less than or equal to about 90 percent. Thus, the module of the present disclosure enables the ratio to be adjusted to tune the performance and location of the module for the particular vehicle.

It should be noted that the module of the present disclosure does not preclude the use of the various enhancement features found in other airbag modules. Thus, the module enables the use of enhancement features such as but not limited to cushion biasing means, cushion chutes, heat shields, actively or passively vented housings, dual depth cushions, dual stage inflators, and the like.

It should also be noted that the terms "first", "second", and "third", and the like may be used herein to modify elements performing similar and/or analogous functions. These modifiers do not imply a spatial, sequential, or hierarchical order to the modified elements unless specifically stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An elongated housing for use in a vehicle having an instrument panel and a windshield proximate the instrument panel, comprising:

a first wall;

a second wall;

a bottom wall joining said first and second walls such that a first width is defined by said bottom wall; and a cushion deployment opening opposite said bottom wall, said cushion deployment opening being defined between a first edge of said first wall and a second edge of said second wall, said cushion deployment opening having a second width, said second width extending in the same direction as said first width and being in a range defined by an upper limit of about 90 percent of said first width and a lower limit of about 30 percent of said first width, said cushion deployment opening remaining substantially a predetermined size during cushion deployment, said second width allowing said housing to be installed proximate said instrument panel such that said first wall is disposed closer to said windshield than said second wall, said second wall being disposed at a predetermined location away from said windshield, said predetermined location being closer to said windshield than a forward most location of a substantially spherical area having a radius of at least 82 millimeters, said forward most location of said substantially spherical area being defined by a position where a portion of said spherical area makes contact with said windshield at one point and another portion of said spherical area makes contact with said instrument panel at another point.

2. The elongated housing as in claim 1, wherein said second width is about 33 percent of said first width.

3. The elongated housing as in claim 1, wherein said second width is about 66 percent of said first width.

4. The elongated housing as in claim 1, wherein said elongated housing defines an inner area comprising:

a first chamber configured to receive an inflator for inflating an inflatable cushion of an airbag module; and a second chamber configured to receive said inflatable cushion.

5. The elongated housing as in claim 4, wherein said inner area further comprises:

a central wall depending from said bottom wall and separating said first chamber from said second chamber.

6. The elongated housing as in claim 5, wherein said first chamber is in fluid communication with said second chamber.

7. The elongated housing as in claim 4, wherein said first wall is configured to direct inflation gas from said inflator in a selected direction.

8. The elongated housing as in claim 4, wherein said first and second chambers are configured so that said inflatable cushion is deployed under pressure.

9. The elongated housing as in claim 4, wherein said inflatable cushion is stored in a folded state in said second chamber, said first and second chambers being configured so that said inflatable cushion is desensitized to a fold geometry of said folded state.

10. The elongated housing as in claim 9, wherein said fold geometry is selected from the group consisting of a horizontal fan fold, a roll fold, and a vertical fold.

11. The elongated housing as in claim 1, wherein said first wall is disposed at a first angle with respect to said bottom wall, said first angle being less than 90 degrees.

12. The elongated housing as in claim 11, wherein said first angle is in a range defined by about 10 degrees and about 80 degrees.

13. The elongated housing as in claim 12, wherein said first angle is about 45 degrees.

14. The elongated housing as in claim 11, wherein said second wall is disposed at a second angle with respect to said bottom wall, said second angle being less than 90 degrees.

15. The elongated housing as in claim 14, wherein said second angle is in a range between 30 degrees and 90 degrees.

16. The elongated housing as in claim 14, wherein said second width of said cushion deployment opening is dependent upon said first and second angles.

17. An airbag module for use in a vehicle having an instrument panel and a windshield proximate the instrument panel, comprising:

a housing defining a first chamber, a second chamber, a deployment opening at one end of said housing, and an inflation gas opening providing fluid communication between said first chamber and said second chamber, said deployment opening having a first width in a first direction, said housing having a second width extending in said first direction, said second width being disposed at a bottom of said housing and said deployment opening being disposed at a top of said housing, said first width being in a range defined by an upper limit of about 90 percent of said second width and a lower limit of about 30 percent of said second width, wherein said deployment opening remains substantially said first width during inflatable cushion deployment;

an inflator for providing a quantity of inflation gas to said first chamber; and an inflatable cushion stored in a folded condition in said second chamber, said inflatable cushion having an inflation opening secured across said inflation gas opening such that said quantity of inflation gas causes said inflatable cushion to deploy from said housing through said deployment opening, said housing being configured to be installed proximate said instrument panel, said instrument panel having a deployment door defined therein, said housing being positioned with respect to said deployment door such that said deployment opening is proximate said deployment door, said quantity of inflation gas inducing said inflatable cushion to deploy from said housing through said deployment opening to open said deployment door, said deployment door having a forward edge proximate said windshield and a rearward edge remote from said windshield, said deployment door pivoting about said forward edge such that said rearward edge travels alone a door opening path during the opening of said deployment door, said door opening path being defined through a first area, wherein a second area is defined by a spherical region having a radius of at least 82 millimeters, wherein a forward most point of said second area is defined by said second area making contact with said windshield and said instrument panel, wherein said forward most point of the second area does not contact said first area.

18. The airbag module as in claim 17, wherein said first width is within a range defined by a lower limit of about 33 percent of said second width and an upper limit of about 66 percent of said second width.

19. The airbag module as in claim 17, wherein said door opening path does not impinge on said windshield.

20. The airbag module as in claim 17, wherein a central wall separates said first chamber from said second chamber, said first chamber being defined by a first wall and a first side of said central wall, and said second chamber being defined by a second wall and a second side of said central wall.

21. The airbag module as in claim 20, wherein said first wall is disposed at a first angle with respect to said bottom of said housing.

22. The airbag module as in claim 21, wherein said second wall is disposed at a second angle with respect to said bottom of said housing.

23. The airbag module as in claim 22, wherein said first width of said cushion deployment opening is dependent upon said first and second angles.

24. The airbag module as in claim 21, wherein said first angle is configured such that said first wall directs said quantity of inflation gas in a selected direction.

25. The airbag module as in claim 20, wherein said first wall is disposed at a first angle with respect to said bottom of said housing, said first angle being about equal to or slightly less than a rake of said windshield.

26. The airbag module as in claim 17, wherein said housing is configured so that a portion of said first chamber is disposed in proximity to said windshield.

27. The airbag module as in claim 17, wherein said first chamber has a substantially arcuate cross sectional shape and said second chamber has a substantially rectangular cross sectional shape.

28. An air bag housing for use with an inflatable cushion and an inflator, the air bag housing being configured for use in a vehicle having an instrument panel and a windshield proximate the instrument panel, comprising:

first and second opposing side walls and a bottom wall disposed therebetween, the first and second side walls and the bottom wall define a receiving volume configured to receive the inflatable cushion and the inflator, the housing having a first dimension in a first direction and a second dimension in a second direction, the housing having an opening communicating with the receiving volume with a first width corresponding to the first dimension and a second width corresponding to the second dimension wherein the first width is substantially smaller than the first dimension, the opening remaining substantially a predetermined size during inflatable cushion deployment, the first width allowing the housing to be installed proximate the instrument panel such that the first wall is disposed closer to the windshield than the second wall, the second wall being disposed at a predetermined location away from the windshield, the predetermined location being closer to the windshield than a forward most location of a substantially spherical area having a radius of at least 82 millimeters, the forward most location of the substantially spherical area being defined by a position where a portion of the spherical area makes contact with the windshield at one point and another portion of the spherical area makes contact with the instrument panel at another point.

29. The air bag housing of claim 28 wherein the first width of the opening is between 30%–90% of the first dimension of the housing.

30. The air bag housing of claim 28 wherein the opening having a second width being equal to the second dimension.

31. An air bag module for use in a vehicle interior having an instrument panel, a windshield proximate the instrument panel and a deployment door positioned in the instrument panel, the air bag module comprising:

a housing including first and second side walls and a bottom wall disposed therebetween, the first and second side walls and the bottom wall define a receiving volume configured to receive the inflatable cushion and the inflator, the housing having a first dimension in a first direction and a second dimension in a second direction, the housing having an opening communicating with the receiving volume with a first width corresponding to the first dimension and a second width corresponding to the second dimension, wherein the first width is substantially smaller than the first dimension, the opening having a periphery smaller than a periphery of the deployment door, the opening maintaining substantially the first width during inflatable cushion deployment, the first width allowing the housing to be installed proximate the instrument panel such that the first wall is disposed closer to the windshield than the second wall, the second wall being disposed at a predetermined location away from the windshield of the vehicle, the predetermined location being closer to the windshield than a forward most location of a substantially spherical area having a radius of at least 82 millimeters, the forward most location of the substantially spherical area being defined by a position where a portion of the spherical area makes contact with the windshield at one point and another portion of the spherical area makes contact with the instrument panel at another point.

32. The air bag module of claim 31 wherein the first width of the opening is between 30%–90% of the first dimension of the housing.

33. An elongated housing for use in a vehicle having an instrument panel and a windshield proximate the instrument panel, comprising:

a first wall;

a second wall;

a rectangular bottom wall coupled to the first and second walls, the rectangular bottom wall having opposing first and second edges each having a first length, the bottom wall further including third and fourth opposing edges each having a second length, the first length being less than the second length; and, an opening opposite said rectangular bottom wall, the opening having a first dimension extending generally parallel to the first edge, the first dimension being substantially smaller than the first length of the first edge, the opening remaining substantially a constant size during inflatable cushion deployment, the first dimension allowing the housing to be installed proximate the instrument panel such that the first wall is disposed closer to the windshield than the second wall, the second wall being disposed at a predetermined location away from the windshield, the predetermined location being closer to the windshield than a forward most location of an arc having a radius of at least 82 millimeters, the forward most location of the arc being defined by a position where a portion of the arc makes contact with the windshield at one point and another portion of the arc makes contact with the instrument panel at another point.

34. An elongated housing for use in a vehicle having an instrument panel and a windshield proximate the instrument panel, comprising:

a first wall;

a second wall; and, a rectangular bottom wall coupled to the first and second walls, the bottom wall having opposing first and second edges, the first wall extending from the first edge at an acute angle with respect to the bottom wall, the second wall extending from the second edge at an acute angle with respect to the bottom wall generally toward the first wall, adjacent ends of the first and second walls defining an opening opposite the bottom wall, the width of the opening being substantially smaller than the distance from the first and second edges, wherein the width of the opening remains substantially a predetermined width during inflatable cushion deployment, the width of the opening allowing the housing to be installed proximate the instrument panel such that the first wall is disposed closer to the windshield than the second wall, the second wall being disposed at a predetermined location away from the windshield, the predetermined location being closer to the windshield than a forward most location of a substantially spherical area having a radius of at least 82 millimeters, the forward most location of the substantially spherical area being defined by a position where a portion of the spherical area makes contact with the windshield at one point and another portion of the spherical area makes contact with the instrument panel at another point.

35. An elongated housing for use in a vehicle having an instrument panel and a windshield proximate the instrument panel, the elongated housing comprising:

a first wall;

a second wall; and, a rectangular bottom wall coupled to the first and second walls, the bottom wall having opposing first and second edges and being configured to hold at least a portion of both an inflatable cushion and an inflator, the first wall extending from the first edge at an acute angle with respect to the bottom wall, the second wall extending from the second edge at an acute angle with respect to the bottom wall generally toward the first wall, adjacent ends of the first and second walls defining an opening opposite the bottom wall, the width of the opening being substantially smaller than the distance from the first and second edges, wherein the width of the opening remains substantially a predetermined width during inflatable cushion deployment.

* * * * *